April 12, 1966 J. H. COE 3,245,431
COMPOSITE TUBING
Filed Oct. 18, 1962 3 Sheets-Sheet 1
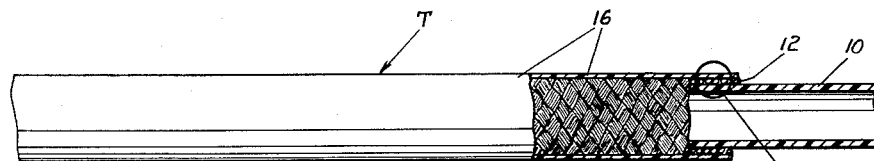
Fig. 1
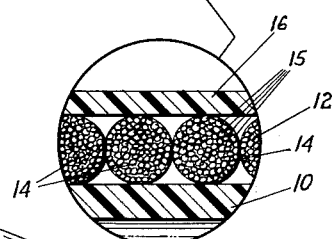
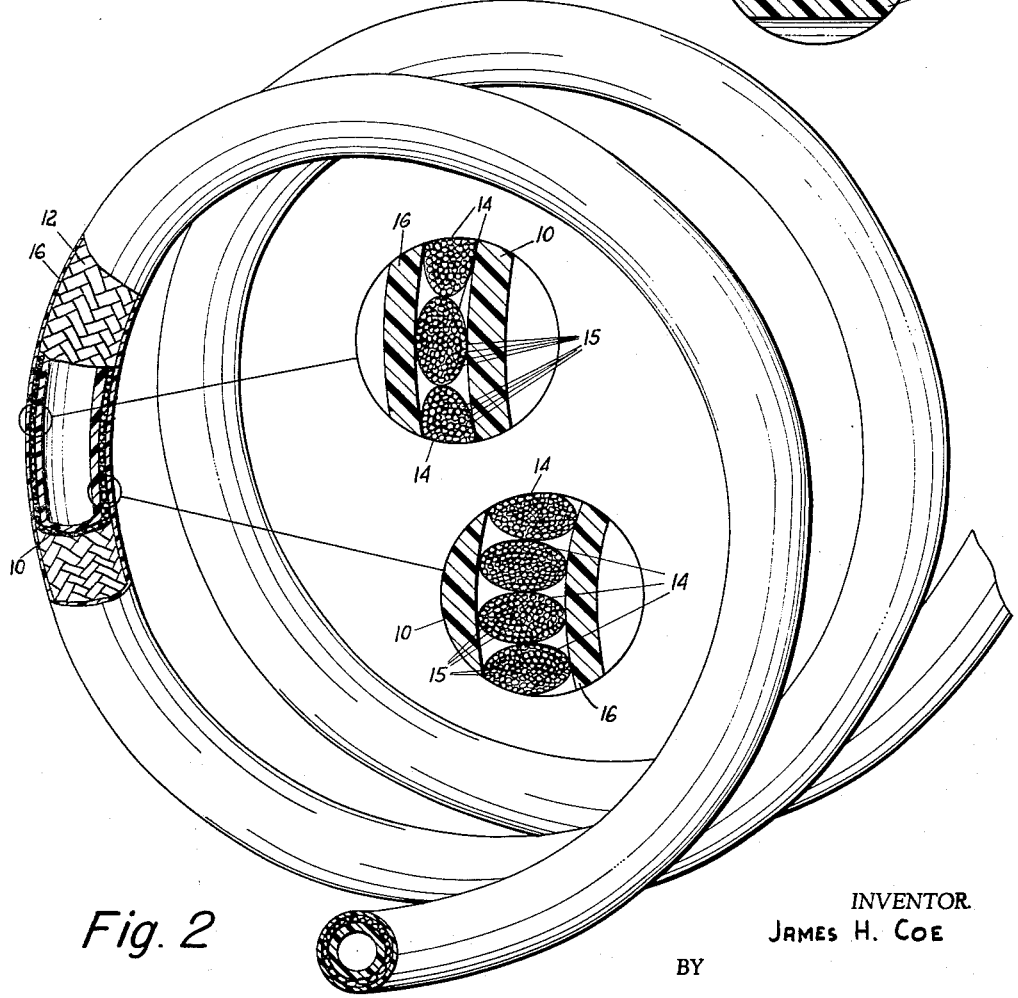
Fig. 2
INVENTOR.
JAMES H. COE
BY
Teare, Fetzer & Teare
ATTORNEYS

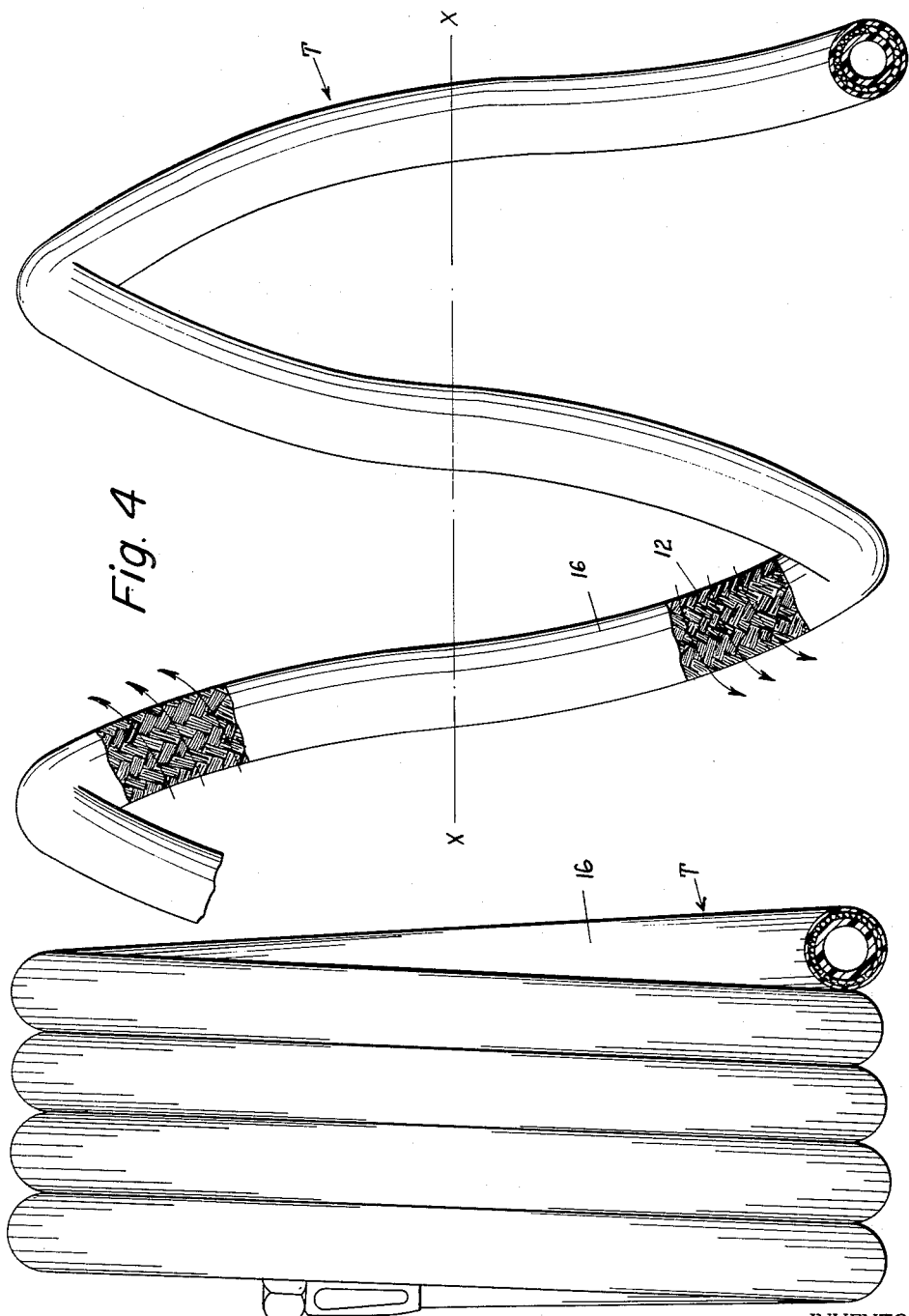

April 12, 1966  J. H. COE  3,245,431
COMPOSITE TUBING
Filed Oct. 18, 1962  3 Sheets-Sheet 3
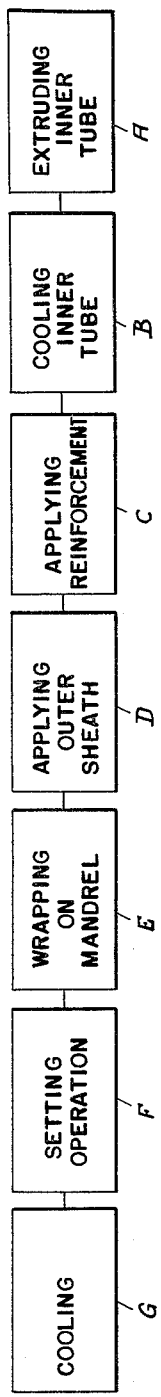
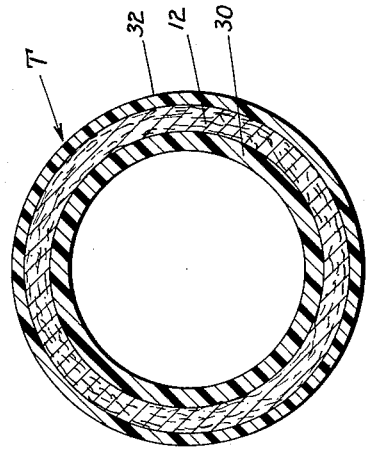
Fig. 6
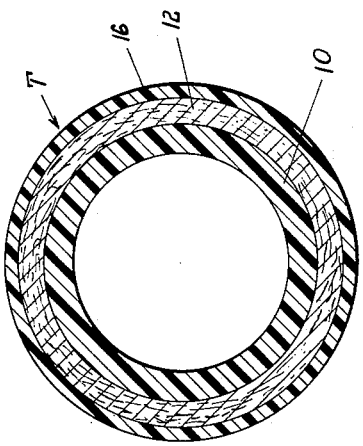
Fig. 5
Fig. 7
INVENTOR.
JAMES H. COE
BY
Teare, Tetzer & Teare
ATTORNEYS

United States Patent Office 3,245,431
Patented Apr. 12, 1966

3,245,431
COMPOSITE TUBING
James H. Coe, Ravenna, Ohio, assignor to Samuel Moore and Company, Mantua, Ohio, a corporation of Ohio
Filed Oct. 18, 1962, Ser. No. 231,531
15 Claims. (Cl. 138—125)

This invention relates to composite tubing or hose, and more particularly to high strength composite tubing of an extensible, self-storing type.

In industry today, there are many instances where pressurized actuating fluid must be transmitted between two or more components of a mechanical device, which components are movable relative to one another. Machine tools, earth moving equipment, material handling equipment, etc. are only a few examples where such situations oftentimes occur. Heretofore such applications oftentimes have utilized large loops of flexible or rubber tubing, sometimes in conjunction with slack take-up pulleys or the like, so as to provide for the relative movement between the component parts of mechanism, or where the relative movement has been strictly linear, sometimes rigid, telescoping fluid transmission lines have been used. Such use of large loops of flexible tubing, either with or without slack take-up devices, are not only unsightly, but such tubing is more readily subject to injury, and sometimes interferes with proper operation of the machine. The telescoping, rigid tubing arrangements are restricted in their applications and comparatively expensive to use.

The present invention provides a novel arrangement of high strength, plastic, composite tubing or hose disposed in flexible coiled or helical form in the general manner of a spring, so that such tubing is self-storing in use, and which is effective for the transmission of high fluid pressure in any extended or retracted condition of the tubing.

Accordingly, an object of the present invention is to provide a novel arrangement of an extensible, coiled, fluid transmission line means for transmitting actuating fluid for use, for instance, between relatively movable parts of a mechanism.

Another object of the invention is to provide an extensible, coiled, self-storing fluid transmission hose which is of a high strength composite construction, and which has increased stability when extended, and increased kink resistant characteristics, under varying temperature and pressure conditions as compared to heretofore known arrangements of tubing.

A still further object of the invention is to provide a self-storing, high strength, extensible, coiled, fluid transmission line or hose, comprising an inner tube of a crystalline-like polymeric material showing relatively little elastic deformation under load, at least one layer of fibrous or strand material disposed about said inner tube and providing a reinforcing member therefor, and an outer sheath or layer of the crystalline-like polymeric material covering the reinforcing layer.

A still further object of the invention is to provide a novel method of producing the aforementioned self-storing composite tubing.

Other objects and advantages of the invention will be apparent from the following description taken in conjunction with the accompanying drawings, wherein:

FIG. 1 is a partially cut-away view of the composite tubing or hose product in accordance with the instant invention, and before such tubing has been wound or disposed into coiled, extensible form; in the enlarged illustration within the circle, the layers of the materials forming the composite tubing are illustrated in greater detail;

FIG. 2 is a generally perspective, partially cut away view of a section of the tubing after it is disposed in coiled, self-storing form and without any axial forces being applied thereto; shown in the enlarged circles thereof is the condiiton of the layers of the wall materials of the composite tubing on the outer and inner peripheries in such coiled condition of the tubing;

FIG. 3 is an elevational view of the composite tubing of FIGS. 1 and 2, but showing such tubing in an axially compressed condition;

FIG. 4 is an elevational view of the tubing of FIGS. 1, 2 and 3, but showing the tubing in extended or axially pulled condition; a portion of the outer sheath of the composite tubing has been cut away in the FIG. 4 illustration, and arrows illustrate the torsional effect on the braid of the composite tubing due to extending of the latter;

FIG. 5 is an enlarged, sectional, generally diagrammatic view of a piece of the composite tubing of the invention, and illustrating generally desirable relationships of the thicknesses of the various layers of materials forming the composite tubing;

FIG. 6 is a sectional view similar to that of FIG. 5 but showing a modified arrangement;

FIG. 7 is a diagrammatic, block flow sheet illustrating a method of forming the extensible, self-storing, high strength, composite tubing of the invention.

Referring now again to the drawings and more particularly to FIG. 1 thereof, there is illustrated a piece of the composite, plastic tubing T, comprising an inner or core tube 10 formed of a crystalline-like polymeric material, such inner tube being adapted to carry a flow of fluid therethrough. Encompassing the inner tube in tensioned relation is a fibrous reinforcing sleeve member 12 comprising a plurality of strands or yarns 14 disposed in a single braided layer about the inner tube. The individual strands or yarns of such braided material are preferably of the floss-type, formed of a substantial plurality of filaments 15 which are generally movable with respect to one another, and especially in the lengthwise direction of the filaments. Superimposed over the reinforcing member or sleeve 12 is an extruded outer sheath 16 of a crystalline-like polymer. The outer sheath 16, the inner tube 10 and the reinforcing sleeve 12 are not bonded to one another with any adhesive or the like and, therefore a certain amount of slippage between the various layers of the tubing is possible, such arrangement providing a high strength, composite tubing product possessing good extensibility and good kink resistant characteristics. The ends of a run of the tubing may be provided with conventional couplings for convenient attachment of the tubing to the elements connected thereby.

Materials suitable for use as the polymeric material of the inner tube and/or the outer sheath, for example, may be the polyamides, the polyacetals, the polycarbonates and the polypropylene resins. The polyamides may be represented commercially, for instance, by the well known type II or the type 6 nylon materials. The polyacetals may be represented commercially by the materials "Delrin" manufactured by the E. I. du Pont de Nemours & Company, Inc. of Delaware, or "Celcon," manufactured by Celanese Corporation of New York. The polycarbonate resins may be represented commercially by "Lexan" manufactured by the General Electric Company of New York. Certain conventional polypropylene materials may also be used.

The strand material for the reinforcing member 12 is preferably composed of polyamide filaments, such as for instance a 1680 denier nylon yarn. Polyester filaments such as poly(alkylene terephthalate) ester fiber, or more specifically poly(ethylene terephthalate) ester fiber, commonly known as "Dacron," are also a suitable material for the strengthening member 12. Various cellulosic fibers, such as the rayons, might also be utilized.

The outer sheath may be of the same type of polymeric material as aforediscussed for use in the inner tube, but it will be understood that it may or may not be of the same material as is used for the inner tube, the most important requirement being that it be of a crystalline-like polymeric material of relatively high modulus.

The strands 14 of the braided material are preferably disposed, as aforementioned, in tensioned relation about the inner tube, thereby insuring as little volumetric expansion of the tubing as possible during the conveying of high pressure fluids therethrough. High pressure as used here means pressures up to and including 3000 p.s.i.

Referring now to FIG. 7, there is diagrammatically shown by means of a flow block diagram, an arrangement for producing the tubing of the invention. The inner tube 10 may be formed by an extrusion A, utilizing conventional procedures and apparatus, to so extrude the inner tube. After extrusion of the inner tube, it may be passed through a cooler B, such as a water bath, for generally setting the inner tube adequately for the braiding operation and so that no material bonding or embedding of the strands of member 12 to or in inner tube 10 occurs. The inner tube may then be passed through a braiding mechanism C which may be of any conventional type, many of which are known in the composite tubing art. At the braiding mechanism, the core tube 10 is braided with one layer 12 of reinforcing material, as for instance a 1680 denier nylon yarn. The braided material may be applied under a line tension of between 2 to 7 lbs., and in angular relation to the axis of the tubing as shown. The braider preferably provides what is known as close to 100% coverage, which means, in effect, that the strands are superimposed over the inner tube so as to provide as nearly complete coverage as possible, or in other words without leaving any interstitial spaces between successive convolutions, insofar as possible. The braid covered inner tube may then be applied (D) to an extruder for application of the outer sheath 16 thereto, using conventional procedures. The viscosity of the outer sheath material is preferably such when applied to the braided core tube that such outer sheath material does not enter between the strands of the braided layer 12, as shown in FIG. 1, and thus no real interlocking of layers 12 and 14 occurs, but instead there is provided for a certain amount of slippage between such layers. After the application of the outer sheath, the tubing is wound (E) in coil or helical form upon a mandrel with the adjacent convolutions disposed in axially spaced relation, and then such tubing wound mandrel is subjected to a "setting" operation (F), to set the composite tubing in such coiled, extensible form. The exterior diameter of the mandrel will determine the interior diameter of the helical run of tubing, and it will be seen that the coils of the tubing as wound on the mandrel are in spaced relation to one another, so that a run of such tubing may be both compressed and extended from its normal rest condition as shown for instance in FIG. 2 of the drawings.

The aforementioned "setting" operation may consist of placing the mandrel and associated tubing in a hot water bath of from about 200 to 250° F. for a period of between sixty and ninety minutes, after which the tubing is permitted to cool (G), at which time the tubing is "set" in its helical configuration, and will return to the condition illustrated in FIG. 2 of the drawings from the conditions illustrated in either FIGS. 3 or 4, after removal of the distorting force. Instead of the latter discussed setting operation, the mandrel and associated tubing may be placed in a high frequency dielectric heating unit which is capable of setting the tubing in a matter of from 20 to 60 seconds, at said temperature of between about 200 to 250° F. Dielectric heating equipment is well known in industry for heating non-conducting materials. After the "setting" operation, the tubing in permanently set, coiled form is removed from the mandrel.

Referring now again to FIG. 2, it will be seen that when the composite tubing is wound upon the mandrel and "set," the strands of the reinforcing material on the inner periphery of the coils of tubing are additionally subjected to a compressive force and thus the individual strands 14 are forced into the compressed, oval state illustrated in the enlarged circle in such figure, with the major axis of the oval of each strand being disposed in a plane extending generally transverse to the axis of the tubing, while the strands on the outer periphery of the coils of the tubing are placed in tension, whereby the major axis of each oval configuration defined by the strands extends in a direction generally perpendicular to the direction of the major axes of the aforementioned strands under compression. Since the angle of the strands with respect to each other in the braided reinforcement of the tubing varies as a function of the extension and retraction of the helix of the tubing, which motion imposes twisting forces on the tubing itself (FIG. 4) it will be seen that a dynamic condition exists which changes with the extension and compression of the helical tubing. This may normally cause coils of a helix to expand unevenly and to attempt to slew around so that they are more parallel to the lengthwise axis X—X of the helix, when such tubing carries relatively high fluid pressure, for instance 500 p.s.i., which "slewing" and uneven coil expansion would result in a structural arrangement very difficult to handle and causing difficulties in extension and compression of a helical hose during changes in the distance between elements which the hose or tubing connected. The instant arrangement of coiled, crystalline-like inner tube, braided reinforcing material, and crystalline-like outer sheath tubing, with such inner tube and outer sheath materials being of a high-modulus plastic, provides a high strength composite tubing product wherein especially the inner tube but also the outer sheath act like a beam of considerable stiffness, preventing "slewing" and uneven coil expansion, and in fact resisting any substantial transverse deflection of a run of the coiled tubing extending between a pair of spaced elements which the tubing connects, while still providing for good extensibility and retractability of the coiled tubing.

Referring now to FIG. 5, there is illustrated more or less diagrammatically a desirable size relationship of the layers of material forming the tubing, when such layers are comprised of type II nylon material for both the inner tube 10 and the outer sheath 16. In this arrangement, a wall thickness of .080 inches is utilized for the inner tube, the latter having a ⅜″ interior diameter, and the outer sheath is provided with a .030 inch wall thickness. While this arrangement of composite tubing possesses good stability under high pressure, it does require a considerable amount of material, and in the interests of economy and greater strength, it is desirable to maintain the wall thickness of the inner tube as small as possible consistent with providing adequate strength for withstanding the high pressures and providing against slewing and uneven expansion of the loops of the coiled tubing.

Referring now to FIG. 6, there is illustrated more or less diagrammatically dimensional relationships between a modified form of the tubing and in this arrangement, the known type 6 nylon material was utilized for the inner core tube 30. Type 6 nylon has a higher flexural modulus as compared to the type II nylon, and thus enables the use of a thinner wall thickness. In this arrangement the wall thickness of the inner tube was .045 inch, utilizing the same thickness of braided layer, and approximately the same thickness and material of outer sheath 32 as heretofore utilized in the FIG. 5 illustration. In other words, the wall thicknesses of the inner tube and the outer sheath became more nearly equal, resulting in a smaller overall diameter tube, able to possess the same interior diameter or fluid carrying capacity, and yet one having increased burst strength, while still possessing the aforediscussed stability and kink resistance under high pressure conditions.

The following table lists various physical properties of the previously identified materials suitable for use in the composite tubing of the invention:

| Property | Nylon Type II | Nylon Type 6 | Poly Acetal | Poly Carbonate | Poly Propylene | ASTM Method |
|---|---|---|---|---|---|---|
| Tensile Strength, p.s.i. | 8,000 | 12,000 | 9,000–10,000 | 9,000–10,500 | 5,000 | D638 |
| Elongation, percent | 120 | 200 | 60–75 | 80 | 220 | D638 |
| Flexural Modulus, p.s.i. | 200,000 | 330,000 | 400,000 | 375,000 | 170,000 | D790 |
| Flexural Strength, p.s.i. | 14,000 | 14,000 | 13,000 | 12,000 | 7,000 | D790 |
| Specific Gravity | 1.04 | 1.13 | 1.41 | 1.20 | 0.90 | D792 |
| Compressive Strength, p.s.i. | 11,000 | 11,000 | 5,200 | 11,000 | 8,500 | D695 |

It will be seen that while polypropylene resins have been listed as being suitable, such polypropylene resins are generally of a substantially lower flexural modulus as compared to that of the polycarbonates, polyacetals, and nylon type 6 materials, and, therefore, would require a thicker wall thickness for providing the aforediscussed stability and kink resistance under high pressure conditions, and generally similar to that of the II nylon material. It will be seen, therefore, that it has been determined that the mass of or wall thickness of resinous material required in the core tube and sheath of the composite self-storing tubing, is generally inversely proportional to the flexural modulus of the material or materials utilized for such core tube and sheath layers of the composite tubing. In other words, those crystalline-like, high modulus, polymeric materials having a higher flexural modulus require a proportionally thinner wall thickness as compared to those materials having a lower flexural modulus, such thinner wall thickness tubing, everything else being equal, providing greater burst strength for the tubing. In any event, in order to provide a self-storing, high strength composite tubing, the materials utilized for the inner tube and outer sheath must be of a crystalline nature of relatively high modulus and only one layer of reinforcing braid may be utilized, it having been found that utilizing a plurality of layers of braids, which acting independently of one another, causes tremendous slewing and instability in the coils of the helical tubing.

From the foregoing discussion and the accompanying drawings, it will be seen that the invention provides a novel arrangement of self-storing, high strength, composite tubing in extensible helical form and comprised of an inner tube of polymeric material, a braided reinforcing layer, and an outer sheath of polymeric material disposed in non-bonded condition, and wherein such material utilized for the inner tube and outer sheath is of a crystalline nature having a relatively high flexural modulus, and with the thicknesses of the walls of the inner tube and outer sheath being generally inversely proportioned to the flexural modulus of the material thereof, in order to obtain a high pressure, high strength, effectively operable, self-storing tubing possessing stability especially under high pressure conditions.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A self-storing composite flexible plastic tubing adapted to transmit high pressure fluid, said tubing being of coiled helical configuration adapted for axial extension and retraction and comprising an inner tube of crystalline-like polymeric mateiral, a single braided layer of fibrous material disposed about said inner tube and forming a reinforcing member therefor, and an outer sheath of crystalline-like polymeric material covering said reinforcing member, said inner tube, reinforcing member and outer sheath being able to slip with respect to one another, the wall thickness of said inner tube and said outer sheath being generally inversely proportional to the flexural modulus of the materials of said inner tube and said outer sheath, whereby said tubing possesses stability under high pressure conditions.

2. A composite tubing in accordance with claim 1 wherein said crystalline-like polymeric materials possess a flexural moduls of at least approximately 170,000 p.s.i.

3. A self-storing composite flexible plastic tubing adapted to transmit high pressure fluid, said tubing being of coiled helical configuration adapted for axial extension and retraction and comprising an inner tube of crystalline-like polymeric material selected from the group consisting of nylon, polyacetal, polycarbonate and polypropylene, a single braided layer of fibrous material disposed about said inner tube and forming a reinforcing member therefor, said reinforcing member comprising a plurality of strands, each of the individual strands of said reinforcing member comprising a plurality of filaments oriented for relative movement with respect to one another and disposed under a line tension of between approximately 2 to 7 pounds, an outer sheath of crystalline-like polymeric material covering said reinforcing member, said outer sheath being selected from the group consisting of nylon, polyacetal, polycarbonate and polypropylene, said inner tube, reinforcing member and outer sheath possessing the ability to slip with respect to one another, said inner tube and outer sheath having a wall thickness generally inversely proportional to the flexural modulus of the materials of said inner tube and said outer sheath, said inner tube having a greater wall thickness than the wall thickness of said outer sheath, said flexural modulus being at least approximately 170,000 p.s.i., whereby said tubing possesses stability during the transmission of high pressure fluids of up to approximately 3000 p.s.i. in any extended and retracted condition of the tubing.

4. A composite tubing in accordance with claim 1, wherein each of the individual strands of such reinforcing member comprise a plurality of filaments disposed for relative movement with respect to one another.

5. A composite tubing in accordance with claim 1, wherein the wall thicknesses of said inner tube and outer sheath are approximately equal.

6. A composite tubing in accordance with claim 1, wherein the wall thickness of said inner tube is approximately twice the wall thickness of said outer sheath.

7. A composite tubing in accordance with claim 1, wherein said reinforcing member is formed of a polyester resin.

8. A composite tubing in accordance with claim 1, wherein at least said inner tube is formed of a polycarbonate resin.

9. A composite tubing in accordance with claim 1, wherein at least said inner tube is formed of a polyacetal resin.

10. A composite tubing in accordance with claim 1, wherein at least said inner tube is formed of a polypropylene resin.

11. A self recoilable, composite, plastic, flexible, high strength tubing adapted to transmit high pressure fluids of over 500 p.s.i., said tubing being of coiled helical configuration adapted for axial extension and retraction and comprising a seamless extruded nylon inner tube having a substantially circular across section, a single layer of braided material disposed in tensioned relation about said inner tube and forming a reinforcing member therefor, said reinforcing member comprising a plurality of floss type strands disposed under a line tension of between approximately 2 to 7 pounds, and an outer sheath of nylon material covering said reinforcing member, said inner tube, reinforcing member and outer sheath possessing the ability to slip with respect to one another, said inner tube and outer sheath having a wall thickness generally inversely proportional to the flexural modulus of the materials of said inner tube and said outer sheath, the wall thickness of said inner tube being greater than the wall thickness of said outer sheath, said flexural modulus being at least approximately 200,000 p.s.i., said tubing possessing stability during the transmission of high pressure fluids in any extended and contracted conditions of the tubing.

12. A tubing in accordance with claim 11 wherein the strands are comprised of polyester filaments.

13. A tubing in accordance with claim 11 wherein the strands are comprised of polyamide filaments.

14. A composite tubing in accordance with claim 1 wherein said reinforcing member is formed of a polyamide resin.

15. A composite tubing in accordance with claim 1, wherein said reinforcing member is formed of a cellulose resin.

References Cited by the Examiner

UNITED STATES PATENTS

| | | | |
|---|---|---|---|
| 2,888,954 | 6/1959 | Gates | 138—137 |
| 2,974,713 | 3/1961 | Hydrick | 156—149 |
| 3,007,497 | 11/1961 | Shobert | 138—125 |
| 3,033,729 | 5/1962 | Shobert | 156—149 |
| 3,062,241 | 11/1962 | Brumbach | 138—125 |
| 3,116,760 | 1/1964 | Matthews | 138—125 |

FOREIGN PATENTS

| | | |
|---|---|---|
| 209,998 | 8/1957 | Australia. |
| 896,388 | 4/1962 | Great Britain. |

LAVERN D. GEIGER, *Primary Examiner.*

EDWARD V. BENHAM, LEWIS J. LENNY, M. CARY NELSON, *Examiners.*